United States Patent Office 2,976,258
Patented Mar. 21, 1961

2,976,258

MOLDING MATERIAL COMPRISING A POLY-
AMIDE AND A NITRILE OF A HIGHER
FATTY ACID, AND PROCESS OF MAKING

Jan Lodewijk Voigt, Arnhem, Netherlands, assignor to
N.V. Onderzoekingsinstituut Research, Arnhem, Neth-
erlands, a corporation of Netherlands No Drawing. Filed Aug. 19, 1958, Ser. No. 755,878

Claims priority, application Netherlands Aug. 21, 1957

3 Claims. (Cl. 260—32.4)

This invention relates to the preparation of a molding material in which a synthetic linear polyamide, prepared by poly-condensation of ε-caprolactam or ε-aminocaproic acid, is mixed with a lubricant comprising a higher fatty acid nitrile.

The lubricant in the molding material serves to facilitate the discharge of molded articles after the casting or injection molding of the synthetic linear polyamides, i.e., prevents the sticking of the molded articles to the mold. On extruding synthetic linear polyamides in softened condition the lubricant facilitates the loosening of the extruded article from the nozzle.

The lubricants used heretofore have been in general oil-like substances. In addition stearates, such as sodium and zinc stearates, have also been employed for this purpose. However, it has been found that in actual practice substances such as these when mixed with synthetic linear polyamides are not particularly satisfactory. Especially when processing synthetic linear polyamides prepared by polycondensation of ε-caprolactam or ε-aminocaproic acid and mixed with said lubricants, the strong adhesion of the articles to the mold appears to be a disturbing factor that interferes with production.

According to the present invention, it has been discovered that the above described difficulties during casting, injection molding or extruding of synthetic linear polyamides prepared by polycondensation of ε-caprolactam or ε-aminocaproic acid may be entirely prevented if, according to the process of the invention, the polyamide is mixed with a nitrile of a higher fatty acid having at least 11 C-atoms as lubricant.

It has been found that relatively small proportions of the nitrile, such as 0.005% by weight based on the synthetic linear polyamide, are sufficient to bring about the desired result. Preferably, however, between 0.02 and 2.5% by weight is used.

The addition of the lubricant may be carried out in many different ways. The lubricant may, for example, be mixed with the synthetic linear polyamide granules before the casting, injection molding or extruding. On the other hand, the lubricant may also be mixed with the molten synthetic linear polyamide.

It should be noted that the addition of the lubricant according to the present invention has no noticeable influence on the properties of the synthetic linear polyamide product.

In order to indicate still more fully the nature of the present invention, the following examples of typical procedures is set forth, it being understood, however, that this further description is presented by way of illustration only, and not as limiting the scope of the invention.

*Example 1*

Granules of a synthetic linear polyamide, obtained by the polycondensation of ε-caprolactam, were molded into combs with the aid of an automatically operating injection molding machine.

The number of combs leaving the machine in succession without sticking amounted to 1.

The same granules were mixed with 0.5% by weight of $CH_3.(CH_2)_{20}.CN$, after which the granules were molded into combs with the same injection molding machine.

The number of combs that could be produced in one series without sticking amounted to 204.

*Example 2*

Polyamide granules as described in Example 1 were mixed with 0.5% by weight of $CH_3.(CH_2)_9.CN$, after which the granules were molded into combs in the same injection molding machine as in Example 1.

Three hundred combs were produced in this manner without any comb sticking in the mold.

It will thus be noted that the foregoing examples involve the use of saturated fatty acid nitriles.

While a specific example of a preferred method of operation embodying the present invention has been set forth above, it will be understood that many changes and modifications may be made in the procedure without departing from the spirit of the invention. It will therefore be understood that the example cited and the particular proportions and methods of operation set forth above are intended to be illustrative only, and are not intended to limit the scope of the invention.

What is claimed is:

1. A process for the preparation of a molding material comprising admixing (a) synthetic linear polyamide prepared by polycondensation of a monomer selected from the class consisting of ε-caprolactam and ε-aminocaproic acid with (b) a lubricant consisting essentially of a nitrile of a saturated higher fatty acid having from 11 to 23 C-atoms.

2. A process according to claim 1, wherein the nitrile is employed to the extent of approximately 0.005 to 2.5% by weight, based on the synthetic linear polyamide.

3. A molding material comprising (a) a synthetic linear polyamide prepared by polycondensation of a monomer selected from the class consisting of ε-caprolactam and ε-aminocaproic acid in admixture with (b) from approximately 0.005% to 2.5% of a lubricant consisting essentially of a nitrile of a saturated higher fatty acid having from 11 to 23 C-atoms, based on the weight of the synthetic linear polyamide.

References Cited in the file of this patent

UNITED STATES PATENTS 2,476,264   Niederhauser _____ July 12, 1949

OTHER REFERENCES

DuPont: Technical Bulletin No. 8B, dated March 15, 1950, Polychemicals Department—Plastics.

Doolittle: The Technology of Solvents and Plasticizers, John Wiley & Sons, New York, 1954, page 1005.

Schildknecht: Polymer Processes, Interscience Publishers, New York, 1956, page 686.